United States Patent [19]

Hallerback

[11] Patent Number: 4,669,894

[45] Date of Patent: Jun. 2, 1987

[54] SEALING RING FOR A BEARING LUBRICATING SYSTEM

[75] Inventor: Stig Hallerback, Frolunda, Sweden

[73] Assignee: Aktiebolaget SKF, Goteborg, Sweden

[21] Appl. No.: 828,720

[22] Filed: Feb. 12, 1986

[30] Foreign Application Priority Data

Feb. 14, 1985 [SE] Sweden ............................ 8500690

[51] Int. Cl.⁴ .................. F16C 33/76; F16C 33/66; F16J 9/08; F16J 15/10
[52] U.S. Cl. .................................. 384/477; 277/75; 277/206 R; 384/475
[58] Field of Search ............. 384/99, 100, 130, 140, 384/143, 147, 399, 462, 466, 473–477, 486, 487; 277/1, 75, 201, 206 R

[56] References Cited

U.S. PATENT DOCUMENTS

| | | | |
|---|---|---|---|
| 2,280,659 | 4/1942 | Muller | 384/475 |
| 2,688,506 | 9/1954 | Bakker | 277/206 R |
| 2,731,310 | 1/1956 | Potter | 384/475 |
| 2,751,235 | 6/1956 | Watts et al. | 277/206 R X |
| 2,754,136 | 7/1956 | Phillips | 277/206 R X |
| 3,101,979 | 8/1963 | Mard | 384/99 |
| 3,184,246 | 5/1965 | Kline | 277/206 R X |
| 3,351,399 | 11/1967 | Gates | 384/475 |
| 3,685,838 | 8/1972 | Malmstrom | 277/75 X |

FOREIGN PATENT DOCUMENTS

| | | | |
|---|---|---|---|
| 1966674 | 3/1958 | Austria | 384/475 |
| 503192 | 5/1954 | Canada | 384/462 |
| 2210209 | 11/1973 | Fed. Rep. of Germany | 277/75 |
| 554331 | 6/1943 | United Kingdom | 277/75 |

*Primary Examiner*—Stuart S. Levy
*Assistant Examiner*—Thomas R. Hannon
*Attorney, Agent, or Firm*—Eugene E. Renz, Jr.

[57] ABSTRACT

A lubricating system including an annular channel, lubricant inlet and outlet ports communicating with the channel, a sealing ring made of flexible elastic material of U-shaped cross section mounted in the channel, a plurality of spaced apart supply holes in the ring, pressure in the supply port operable to displace the sealing ring to permit fluid communicating between the inlet port and one of the supply holes. The supply holes are arranged so that two holes are not disposed diametrically opposite one another.

4 Claims, 7 Drawing Figures

SEALING RING FOR A BEARING LUBRICATING SYSTEM

FIELD OF THE INVENTION

The present invention refers to a method of preventing oil leakage when lubricating bearings or the like mounted in a housing. The invention also incorporates an elastic sealing ring intended to be used in connection with the method.

BACKGROUND OF THE INVENTION

In order to make a sliding or rolling bearing operate satisfactorily it is necessary that the bearing is supplied with a proper volume of lubricant in order always to let a thin lubricant film separate the movable metallic components of the bearing. It is important that this lubricant film has a thickness sufficient to ascertain that metallic contact will not occur, but it shall on the other hand not be too thick, as it then will constitute a resistance against the motions resulting in a temperature increase.

Some bearings are sealed off and lubricated once for all, whereas other bearings require an even supply of lubricant. Those latter bearings are often supplied continuously with lubricant via separate devices.

It has always been the goal of bearing designers to supply the bearing with as small a quantity of lubricant as possible to ensure maintenance of a reliable oil film. Rather small volumes of lubricant have thereby been reached. As an example, it has been found that a lubricant supply of about 3 mm$^3$/min for a rolling bearing having an outer diameter of 200 mm is adequate. The desire is, however, to reach still smaller amounts of supplied lubricant, i.e. in the range of 1 mm$^3$/min.

However, a new problem arises when supplying such small volumes of lubricant, that is lubricant leakages which are always present, will be considerable in relation to the lubricant volume supplied. This is of particular concern in bearings of the type mounted in two-part housings and wherein lubricant is supplied through channels in the housing and in the outer bearing race ring. Since these channels are partly situated in the interface between the metallic parts, it is virtually impossible to prevent a certain amount of lubricant leakage.

SUMMARY OF THE INVENTION

In accordance with the present invention, these problems, however, have been solved and a system of preventing oil leakage when lubricating bearings or the like mounted in a housing, has been provided whereby the lubricant is supplied to the interior of the bearing through holes in the outer race ring, which holes communicate with a peripheral lubricant groove arranged on the outer side of the outer race ring. The system incorporates an elastic sealing ring having a U-shaped cross-section which is inserted into the lubricant groove so that the opening of the U-shape is directed towards the outer side of the outer race ring.

It is suitable that the sealing ring is given a somewhat smaller diameter than that of the lubricant groove to allow the sealing ring to get a hard grip around the outer race ring.

Supply holes for lubricant are provided in the web portion of the sealing ring for ascertaining that lubricant will reach the inner side of the sealing ring. It is preferred that these holes are arranged thus that two holes never are situated diametrically opposite to each other.

BRIEF DESCRIPTION OF THE DRAWINGS

The invention will hereinafter be further described with reference to the accompanying drawings, wherein.

DESCRIPTION OF THE PREFERRED EMBODIMENT

Figure 1:
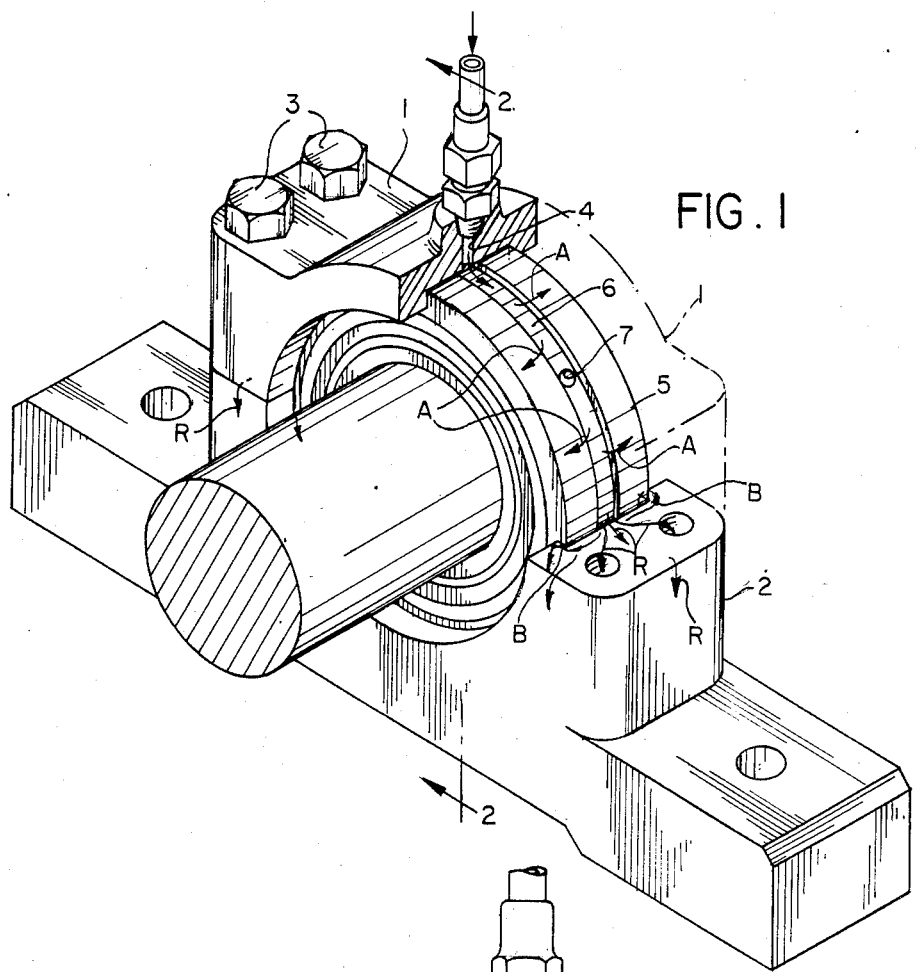
FIG. 1 is a perspective view partly in section showing a typical bearing housing and shaft mounting arrangement.
Figure 2:
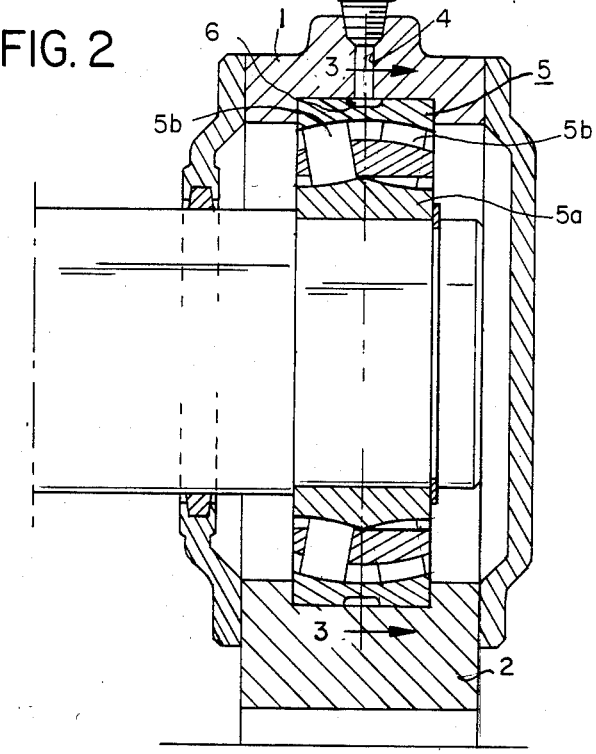
FIG. 2 is an enlarged sectional view taken on lines 2—2 of FIG. 1.

FIG. 1 shows the upper and lower parts 1 and 2 of a bearing housing which are interconnected by means of one or more bolts 3 at each side. A through hole 4 for supply of lubricant has been drilled through the upper part 1 of the bearing housing.

A conventional bearing is mounted inside the bearing housing comprising inner and outer rings 5a, 5 and a plurality of rolling elements 5b. On the outer side of the outer race ring 5 there is shown a peripheral groove 6. This groove communicates with the hole 4 of the bearing housing, and lubricant from the exterior can flow through the hole 4 and into this groove 6. For allowing the lubricant to arrive where it is required, i.e. in the interior of the bearing, bores 7 have been arranged in the groove 6 of the outer race ring, to allow the lubricant to flow in via these bores 7.

In accordance with the arrangement as shown in FIG. 1, the lubricant will leak out axially between the outer side of the outer race ring and the inner side of the bearing housing, such as shown by the arrows A. Lubricant will furthermore flow out axially in the groove present in the joint between the two housing halves. This groove is more or less distinct, due to how accurate the burrs have been filed off after the molding when the housing halves were produced. This flow leakage has been shown at B. Lubricant will also flow out between the connecting flanges of the housing halves and out through the bolt holes. This leakage has been shown at R.

Since several different leakage paths are present in a device according to FIG. 1, it is very difficult to seal off devices of the type shown in the figure. Also very small lubricant losses can be serious, and this places large demands on the seal.

Figure 4:
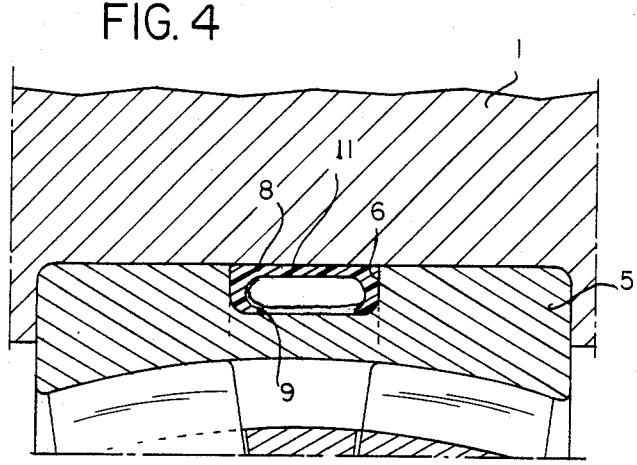
FIGS. 4 and 5 are enlarged fragmentary sectional views taken on lines 4—4 and 5—5 of FIG. 3.
Figure 5:
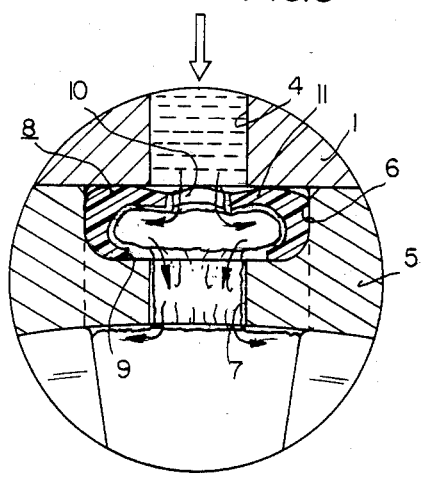
Figure 3:
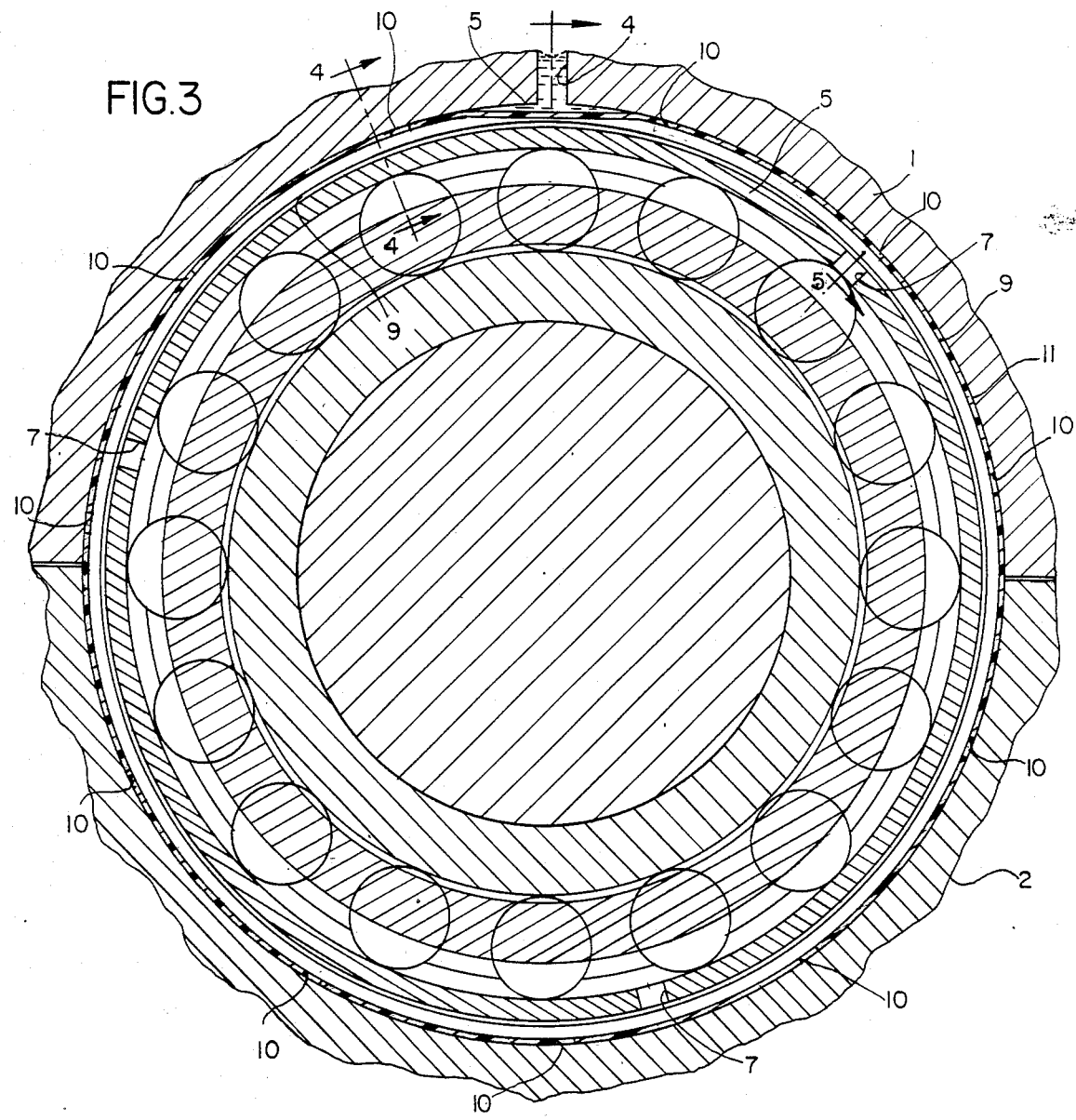
FIG. 3 is an enlarged transverse cross-sectional view showing the sealing ring arrangement of the present invention.
Figure 6:
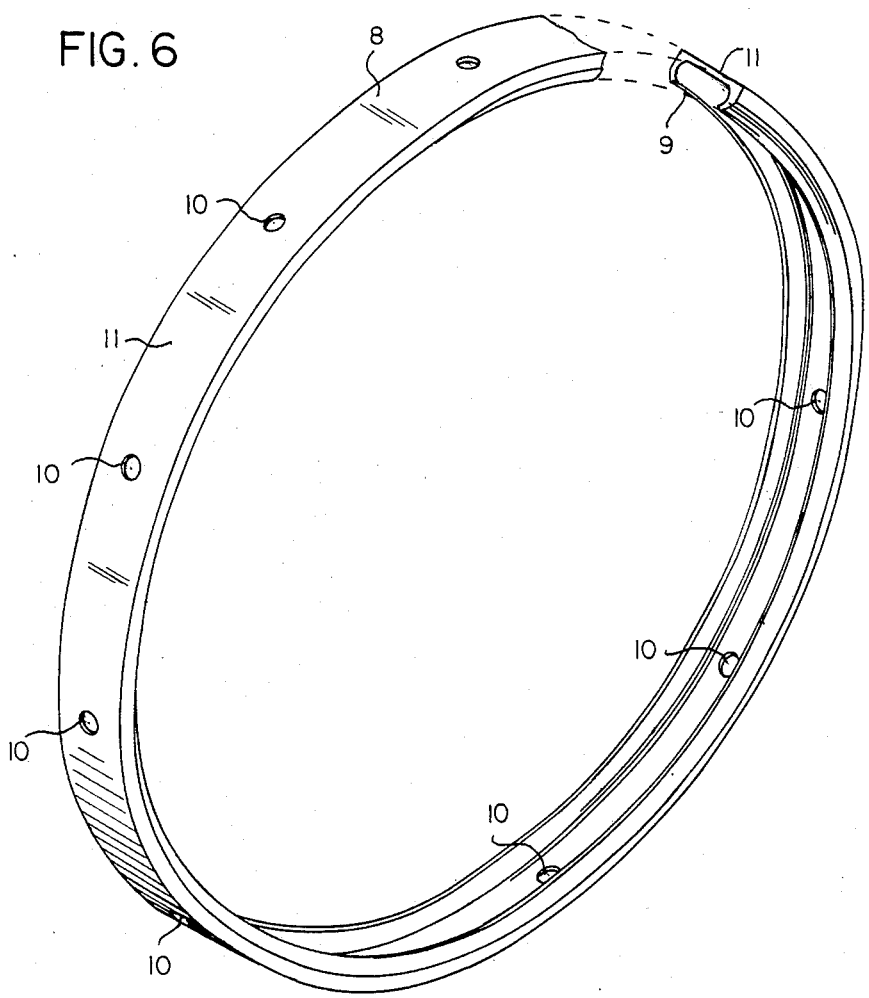
FIG. 6 is a perspective view of the sealing ring of the present invention.
Figure 7:
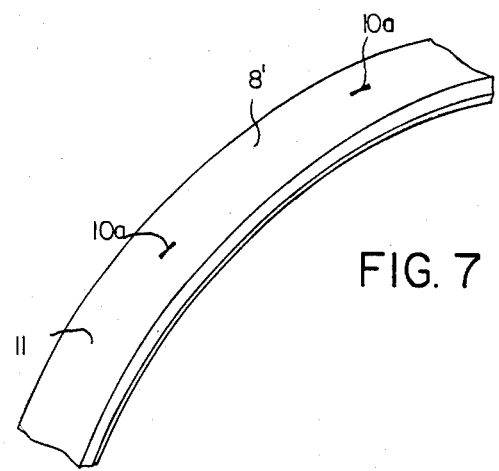
FIG. 7 is a fragmentary perspective view showing a modified form of the openings in the sealing ring.

According to the invention and as shown in FIGS. 3–5 an elastic annular seal 8 is mounted in the groove 6 The seal 8 is preferably made of a flexible resilient material, e.g. rubber, and has a cross-sectional shape of a U with its opening 9 turned inwards towards the outside of the outer race ring. To allow the lubricant which is pressed through the hole 4 in the upper part 1 of the bearing housing to reach the radially inner side of the seal there are supply holes 10 in the web portion 11 of the seal. These holes do not have to be open. It can be sufficient that they are present as slits 10a or the like which permit penetration of oil.

To have the seal arrangement function properly it is necessary that one of these holes 10 is in front of or close to the opening 4 in the bearing housing. This seal will during the lifetime of the bearing not be stationary and it is, therefore, compulsory to have a plurality of holes 10 in the seal, for example 11. One hole 10 will then always be in the vicinity of the inlet hole 4.

One of these holes 10 may, however, also be located straight in front of the connection groove between the two halves 1 and 2 of the housing and accordingly let oil flow out in the groove. To prevent this one has arranged the holes so that two holes 10 never are diametrically opposite each other, so that leakage can occur at the same time at both sides of the bearing, and, moreover, one has arranged the holes so that the one hole 10 which is closest to the inlet opening 4 in the housing conducts oil to that side where the groove has been sealed. This can occur because the inlet opening 4 is located at the highest point of the housing half 1 and the inflowing oil will then flow downwards on that side where it comes in, and later in through the hole 7 into the bearing. This is shown on FIG. 3 from which it is evident that oil is pressed in at the right side, which means that the right side groove is sealed.

The number of equally distributed holes 10 which should be present in the web portion 11 may be expressed through the formula $$n = 3 + K \cdot 4$$

where n means the number of holes and K is an integer 0, 1, 2, 3 . . . The invention is not limited to the embodiment examples shown but can be modified in different ways within the scope of the claims.

What is claimed is:

1. In a lubricating system for a bearing including an outer race ring mounted in a housing, including an annular lubricant channel arranged on an outer periphery of said outer race ring, a lubricant inlet port in said housing communicating with said channel, outlet ports in said outer race communicating with said channel, for supplying lubricants to an interior of the bearing, a sealing ring made of a flexible elastic material of U-shaped cross section mounted in said channel, a plurality of spaced apart supply holes in the ring, pressure in the inlet port operable to displace the sealing ring to permit fluid communication between the inlet port and one of said supply holes, said supply holes being arrayed so that two holes are not disposed diametrically opposite one another thereby preventing oil leakage between the channel and the housing.

2. In a lubricating system as claimed in claim 1, wherein the sealing ring has a smaller inner diameter than that of the lubricant channel.

3. In a lubricating system as claimed in claim 1, wherein said holes for lubricant are arranged in a web portion of the sealing ring.

4. In a lubricant system as claimed in claim 1, wherein the sealing ring is designed with a section of a U with the U-shanks turned inwards towards one another.

* * * * *